United States Patent [19]
Squires

[11] 4,000,066
[45] Dec. 28, 1976

[54] TREATING LIQUID AND GRANULAR MATERIAL IN PANEL BED

[76] Inventor: Arthur M. Squires, 245 W. 104 St., New York, N.Y. 10025

[22] Filed: Sept. 19, 1974

[21] Appl. No.: 507,376

[52] U.S. Cl. .............................. 210/33; 210/37 R; 210/39; 210/80; 210/82; 210/189; 210/275

[51] Int. Cl.² ................. B01D 15/02; B01D 15/04; B01D 15/06; B01D 39/02

[58] Field of Search ............ 23/284, 288 G, 288 S; 34/64, 65, 168–174; 55/96, 98, 282, 387, 474, 518; 208/152; 210/80, 82, 84, 189, 263, 268, 269, 275, 277, 279, 33, 37 R, 39

[56] References Cited
UNITED STATES PATENTS

| | | | |
|---|---|---|---|
| 557,177 | 3/1896 | Wilder | 210/263 |
| 921,115 | 5/1909 | Jewell | 210/269 X |
| 3,296,775 | 1/1967 | Squires | 55/98 |
| 3,368,328 | 2/1968 | Reinauer | 55/96 |
| 3,410,055 | 11/1968 | Zenz | 55/98 X |
| 3,410,056 | 11/1968 | Reinauer | 55/96 |
| 3,770,388 | 11/1973 | Zenz | 55/98 X |
| 3,854,902 | 12/1974 | Kalen | 55/98 X |

Primary Examiner—Charles N. Hart
Assistant Examiner—Robert H. Spitzer

[57] ABSTRACT

There is provided a pulseback technique for cleaning and renewing a panel bed contactor suitable for chemical or physical treatment of liquid and granular material. Free surfaces for entry of liquid are supported cooperatively by louvers. A pulseback technique rids the liquid entry surfaces of granular material spent by the treatment, including accumulated fine dirt particles if the treatment includes filtration to remove the dirt. The pulseback consists of a reverse transient flow across the panel bed of a intensity moderated so that the reverse pressure differential exceeds a critical minimum difference for not more than about 2000 milliseconds and attains a top value within about 600 milliseconds after the pressure differential surpasses the critical minimum difference.

26 Claims, 7 Drawing Figures

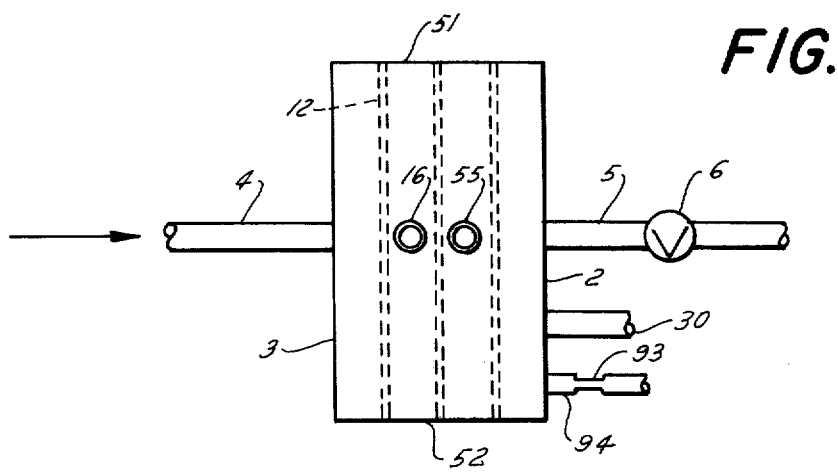
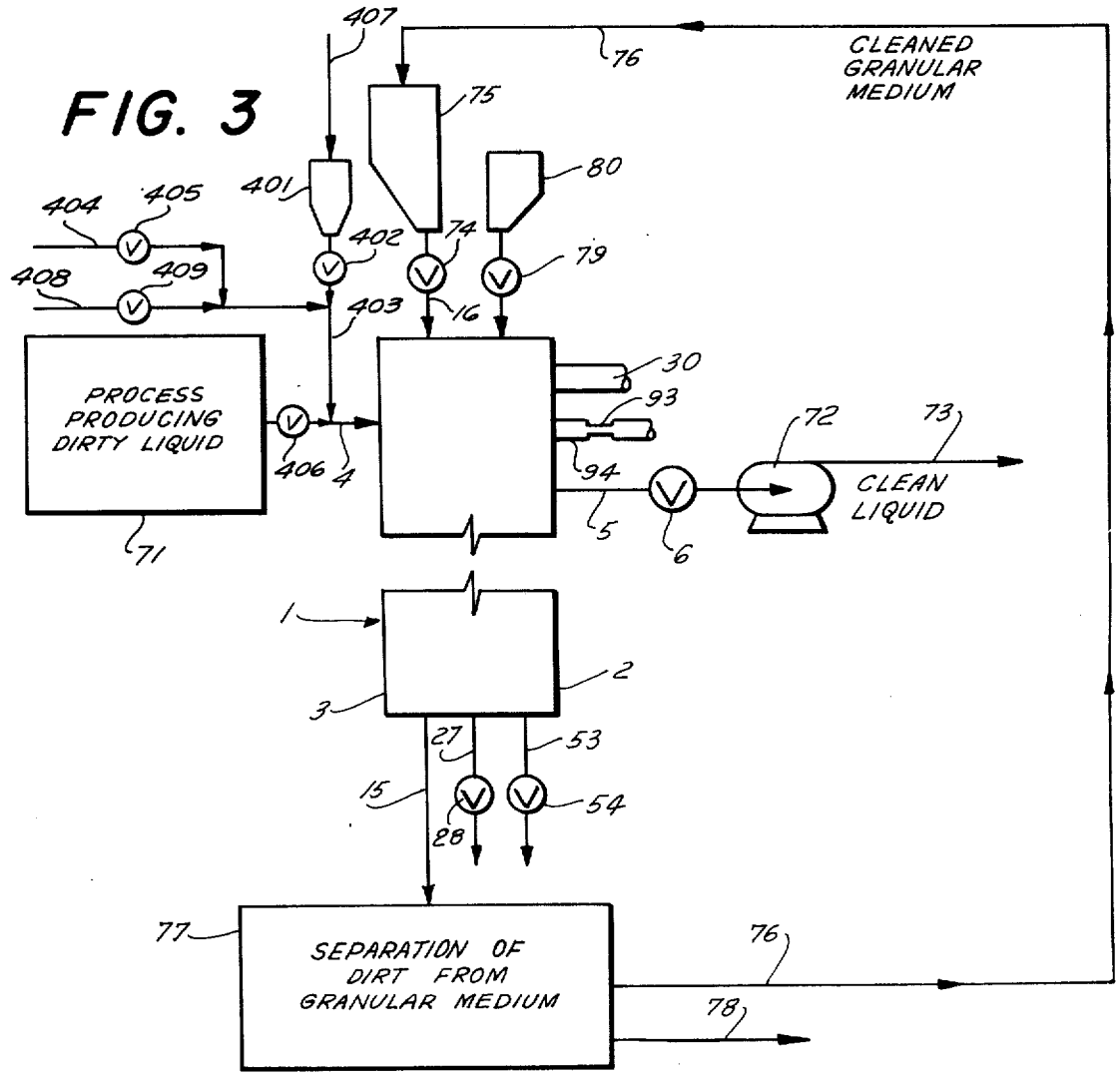

TREATING LIQUID AND GRANULAR MATERIAL IN PANEL BED

CROSS-REFERENCE TO RELATED APPLICATIONS

This application is related to my co-pending applications, filed on Aug. 28, 1974, numbered and entitled as follows:

1. Treating Gas and Granular Material in Panel Bed, Ser. No. 501,276
2. Filtering Dusty Gas in Panel Bed, Ser. No. 501,278
3. Countercurrent Contacting of Gas and Granular Material in Panel Bed, Ser. No. 501,277
4. Treating Gas and Fine Granular Material in Panel Bed, Ser. No. 501,275

The instant application is also related to my co-pending applications, filed simultaneously herewith, numbered and entitled as follows:

5. Electrostatic Filtration in Panel Bed, Ser. No. 507,387
6. Precoating Panel Bed for Filtering Aerosol of Micron-Size Particulates, Ser. No. 507,403
7. Treating Gas with Chemically Reactive Dust in Panel Bed, Ser. No. 507,286
8. Treating Gas with Catalytic Dust in Panel Bed, Ser. No. 507,385
9. Solid-Gas Heat Exchange in Countercurrent Contacting of Gas and Granular Material in Panel Bed, Ser No. 507,398
10. Treating Gas and Wetted Granular Material in Panel Bed, Ser. No. 507,377

The instant application is the eleventh of this sequence.

FIELD OF THE INVENTION

The invention relates to the intimate contacting of a liquid and a granular solid material for the purpose of chemically or physically treating one or both of these substances, for example to filter dirt particles from the liquid or to effect a chemical change in liquid or solid or to remove a chemical constituent of the liquid by absorption or adsorption or to heat a cold liquid by contact with a hot solid. Specifically, contact is improved by a new transient reverse flow liquid treatment of the granular solid material.

DESCRIPTION OF THE PRIOR ART

My aforementioned co-pending application number 1, "Treating Gas and Granular Material in Panel Bed", furnishes a review of prior art relating to panel beds, with emphasis upon art relating to techniques for removing spent granular material, together with filtered dust if any is present, from fluid entry surfaces of such panels. I incorporate this review in the instant application by reference.

My earlier U.S. Pat. No. 3,296,775 (Jan. 10, 1967) taught a reverse surge flow of gas across a panel bed to produce a movement of the granular material in a mass toward the outer edges of louvers supporting gas entry faces, effecting a spill of the material from each face, and removing filter cake if present. The surge flow was to peak sharply to a flow substantially above the minimum steady flow rate at which a steady reverse flow of gas just causes motion of the granular material, and thereafter was to decline substantially immediately.

My aforementioned co-pending application number 1, "Treating Gas and Granular Material in Panel Bed", provides a more particular characterization of a reverse transient flow of gas (i.e., puffback) to produce a movement of granular material in mass (a "body movement") toward the gas entry faces of a panel bed.

My aforementioned co-pending application number 2, "Filtering Dusty Gas in Improved Panel Bed", provides an improved chevron louver for support of gas entry faces of a panel bed, with the advantage that filtered dust penetrating the bed is not dragged downward in the general motion of solid in the panel bed that follows puffback cleaning.

The aforementioned co-pending application number 3, "Countercurrent Contacting of Gas and Granular Material in Panel Bed", provides an improved gently curved louver that promotes countercurrenticity of contacting between gas and solid treated in a panel bed. This application reviews prior proposals for ways to achieve countercurrenticity in panel bed devices, and I incorporate this review in the instant application by reference.

The aforementioned co-pending application number 4, Ser. No. 501,275, disclosed an arrangement advantageous for retaining relatively fine granular material in a panel bed fitted for cleaning by puffback while at the same time using relatively high gas velocities into the face of the panel, such as could blow away the fine material if it were not properly retained. In the disclosed arrangement, the gas exit portions of the panel bed are retained by a column of closely spaced louvers. A second bed of a coarser, preferably denser granular solid is placed next to this column. The second bed is retained between the column of closely spaced louvers and a perforate wall spaced apart from the column. Gas exiting from the primary panel bed traverses the second bed. Although some leakage of the finer granular material into the coarser second bed may occur, substantially none of the finer granular material passes altogether through the coarser second bed, to be carried away by gas leaving the second bed. An important feature of the arrangement is that the spacing of the closely spaced louvers is approximately the dimensions of the coarser particles of the second bed, so that these particles do not participate in the body movement of the finer granular material when the panel bed is cleaned by puffback, i.e., so that the coarser particles do not penetrate into the panel bed of finer granular material during puffback cleaning and renewal of the finer material.

U.S. Pat. No. 557,177 (Mar. 31, 1896), U.S. Pat. No. 631,143 (Aug. 15, 1899), U.S. Pat. No. 989,665 (Apr. 18, 1911), and French Pat. No. 474,615 (Mar. 2, 1915) taught cleaning and renewal of a panel bed device for liquid filtration by backwashing the panel bed with a clean liquid.

U.S. Pat. No. 2,780,363 (Feb. 5, 1957) taught use of a sudden expansion of gas from a reservoir to drive a liquid across a fixed-medium filter in a sudden reverse transient flow, or surge flow, in the direction opposite to the flow of dirty liquid being treated, for purpose of dislodging deposits of accumulated filtered dirt adhering to the fixed filtering surface.

GENERAL DESCRIPTION OF THE INVENTION

In a desire to acquire a wider understanding of the operation of panel bed devices for treating fluids and granular materials, I set up a test apparatus that duplicated in its essential details the drawing that accompanies the aforementioned French Pat. No. 474,615. I attempted to operate the apparatus according to my best understanding of the teachings of this patent. In numerous attempts to clean and renew the liquid entry faces of the panel bed of the apparatus, by causing a steady flow of liquid to pass through the panel bed in the reverse direction to normal flow during its use as a liquid filter, I never succeeded in obtaining a useful result. In my experience, such a steady backwash of liquid succeeded only in producing localized spills of the granular material from only a portion of the liquid entry faces. The spills originated at edges of the supporting louvers next to the upper and inner edges of the liquid entry faces, and the spills constituted material dragged by the backflowing liquid from the interior of the panel bed; they appeared to contain little if any material constituting the liquid entry faces themselves.

It occurred to me to try blowing a puff of air from my mouth into a pipe communicating with a liquid surface on the side of the panel normally used for liquid exit. To my surprise, I observed the body movement of granular material toward each liquid entry face with which I was familiar from my experiments with renewable panel beds for gas-solid treatment (see discussion of these experiments in my aforementioned co-pending application number 1). By this experience, I discovered that even a relatively weak surge of flow of liquid in the reverse direction can create the desirable body movement that is capable of spilling material from liquid entry faces and thereby cleaning and renewing the faces for repeated use. In my first attempt, however, to provide a reverse transient flow of liquid across the panel bed by releasing compressed air from a reservoir into a pipe communicating with a liquid surface on the liquid exit side of the panel, I again observed undesirable localized spills from the liquid entry faces, ineffective for cleaning and renewing the faces. Moreover, the spills were badly uneven in size. This disappointment taught me that only a reverse transient flow of a particular character can produce satisfactory cleaning and renewing of the liquid entry faces. After further experimentation, I have now discovered the particular limits that characterize a reverse transient flow for satisfactory cleaning and for production of substantially uniform spills of granular material from the several liquid entry faces of a panel bed.

OBJECTS OF THE INVENTION

An object of the invention is to provide an improved method and apparatus for the chemical and physical treatment of at least one of a liquid and a granular medium brought into contact.

Another object is to provide an improved method and apparatus for bringing a liquid and a granular solid into intimate contact.

Another object is to provide a filter to remove particulate dirt from a liquid.

Another object is to provide an improved technique for periodically removing granular material adjacent to the liquid entry face of a panel bed filter or panel bed contactor.

Another object is to provide an improved method and apparatus for bringing a liquid and a granular solid into intimate countercurrent contact.

Another object is to provide an improved method for removing a chemical constituent from a liquid by absorption or adsorption by an active granular solid.

Another object is to provide an improved method for transferring heat between a granular solid material and a liquid.

Another object is to provide a renewable panel bed filter method for removing fine particulate dirt from a liquid by separation and accumulation of the dirt on surface layer deposits of a larger particulate medium upon liquid entry surfaces of still larger granular material arranged in a panel bed.

SUMMARY OF THE METHOD FEATURES OF THE INVENTION

My invention relates to an improved method of contacting liquid and granular material with each other to effect physical or chemical treatment of at least one of them. Granular material is arranged in a panel bed having a plurality of transversely disposed, upwardly spaced, liquid entry portions separated by interposed supporting members having outer and inner edges. The liquid entry portions have liquid entry faces that are substantially contiguous with these outer edges. The bed has liquid exit portions spaced horizontally apart from the inner edges. Liquid is caused to flow forwardly through the liquid entry portions of the granular material bed and outwardly from the liquid exit portions to effect treatment of liquid or granular material or both. Thereafter, a transient flow of liquid is caused to move in the direction in reverse to the aforementioned flow of liquid. The transient reverse flow produces first a rise and subsequently a fall in the pressure difference between the liquid exit portions and the liquid entry portions. This difference should remain greater than a critical minimum difference for a time interval less than about 2000 milliseconds, this critical difference being that difference at which a steady flow of liquid in the aforementioned reverse direction just produces a localized spill of granular material from the gas entry faces. The pressure difference produced by the transient reverse flow should peak to a top value within not more than about 600 milliseconds after the difference surpassed the critical minimum difference. The transient reverse flow causes a body movement of the granular material toward the liquid entry faces to spill a portion of the granular material from the bed.

For convenience of reference, I use the term pulseback for the specified reverse transient flow of liquid. The term pulseback cleaning or pulseback renewal denotes broadly the new cleaning or renewal technique provided by the invention, whereby a panel bed liquid-solid contactor is rid of granular medium spent by the aforementioned treatment, along with dirt captured by filtration, if any is present.

If the treatment is for filtration of particulate dirt from a liquid, the aforementioned time interval is preferably less than about 200 milliseconds, and the pressure difference preferably peaks to a top value within not more than about 60 milliseconds after the difference surpasses the critical minimum difference.

It is sometimes preferable to stop the forward flow of liquid before applying the specified reverse transient flow of liquid, in order to allow granular material together with dirt to fall to the bottom of a space communicating with the liquid entry faces while the liquid in this space remains relatively quiet.

The method of the invention is useful for removing fine inorganic matter from a liquid fuel produced from a bituminous coal or subbituminous coal or lignite, where the inorganic matter was originally present in the coal or lignite.

The method is also useful for removing finely divided asbestiform ar acicular matter from waste water from the processing of an ore containing a mineral such as the cummingtonite-grunerite present in the taconite ore bodies of Minnesota, whose treatment has been accompanied by discharge of asbestiform amphibole material into Lake Superior. The method is generally useful for removing amphibole and chrysotile asbestos fiber fragments from liquids.

Where the panel bed of the invention is used to filter particulate dirt from a liquid, the preferred size of granular material of the panel bed depends in large degree upon the size of the dirt and also upon its concentration. If very tiny particles of dirt are to be filtered, such as particles of about 1 micron in size, it will be preferable to use a relatively small granular material, such as quartz sand smaller than about 10 mesh, or preferably smaller than about 20 mesh, and to place precoat surface layer deposits of a much finer granular or fibrous medium on the liquid entry faces of the panel bed to improve filtration efficiency. In general, I prefer to use granular materials in the panel bed larger than about 100 mesh, and the finer granular or fibrous medium is preferably smaller than about 120 mesh. If the tiny dirt particles are present in a small concentration, fly ash from the combustion of pulverized coal is a convenient granular medium for the precoat surface layer deposits. If the dirt particles are present in high concentration, it is preferable to use a fibrous medium, such as asbestos fibers, or very light particles such as perlite and other media conventionally used as liquid filter aids. The fibrous or conventional filter aid media have the advantage over fly ash that much more of the dirt particles can be accumulated in the surface layer deposits before the pressure drop builds up to a level requiring cleaning and renewal of the panel bed by the agency of pulseback.

If large particles are to be filtered, for recovery of a valuable solid product or for removal of a dirt, much larger granular materials will be preferred, including sizes up to 1 inch or even larger. If a wide range of particle sizes is present in the liquid to be filtered, it is advantageous to provide a series of panel beds of progressively smaller granular material size in their respective liquid entry faces in the direction of the forward flow of the liquid to be treated by filtration. The liquid would first flow forwardly through a panel bed of a large granular material, leaving behind on this material a deposit of relatively large particles, and then would pass through a second panel bed having inlet faces narrowly spaced apart horizontally from the liquid exit portions of the first panel bed. The liquid would leave behind on the smaller granular material of the second bed a deposit of smaller particles. And so forth, with a suitable number of panel beds and a suitable size of the granular material in the last bed both to remove the smallest particle that it is desired be removed from the liquid but also to provide good accumulation capacity in the several panel beds for several ranges of size of particulate matter to be filtered. Pulseback cleaning could be practiced for each of the panel beds individually, to suit the best time for cleaning each of the beds in accordance with pressure differential build-up across each bed on account of the accumulation of filtered matter.

SUMMARY OF METHOD FEATURES FOR COUNTERCURRENT CONTACTING

Where countercurrenticity of contacting of liquid and granular material is desired, it is preferable to arrange the granular material in a panel bed where a typical supporting member is gently curved and inclines downwardly and inwardly from its outer edge and then upwardly and inwardly toward its inner edge. The inner edge of a typical supporting member is either above the inner edge of the liquid entry face supported by the member or, when below, a line drawn through these edges is inclined at an angle or less than about 45° to the horizontal. For this arrangement, the aforementioned time interval is preferably less than about 400 milliseconds, and the difference in pressure from the liquid exit portions to liquid entry portions preferably peaks to a top value within not more than about 120 milliseconds after the difference surpasses the critical minimum difference. The arrangement is useful for removing a chemical constituent from the liquid to be treated by providing a granular material adsorptive toward the constituent. A wide variety of chemical constituents can be removed from a variety of liquids by a number of solid adsorbents [for examples, see *Chemical Engineers' Handbook*, John H. Perry, editor, Third Edition, McGraw-Hill, 1950, pages 885 through 916],such as Fuller's earth, bauxite, acid-treated clay, bone char, active carbons, alumina, silica gel, ion-exchange resins, molecular sieves, and magnesia. The method of the invention affords an arrangement of outstandingly high liquid-treating capacity at low pressure drop in the liquid, as well as the special advantage that the inventory of adsorptive granular material, often an expensive material, is small in comparison to the inventory in conventional fixed-bed devices for contacting such materials with liquids, and, correspondingly, the advantage that the investment therein is also small. In general, I prefer to use a granular material smaller than about 4 mesh in counterpart contacting, and materials smaller than about 20 mesh have the advantage, in general, of lower cost and of making possible a more compact arrangement.

SUMMARY OF METHOD FEATURES FOR PLACING LIQUID ENTRY FACES IN LESS THAN PERFECT CONTIGUITY WITH OUTER EDGES OF SUPPORT MEMBERS

Where a fine particulate is to be separated and removed by filtration from a liquid, such as the aforementioned inorganic matter in a liquid fuel made from coal or lignite or the aforementioned asbestiform matter, it is preferable to arrange the granular material in a panel bed where a typical supporting member has an upper and a lower surface each having outer and inner edges with respect to the bed, the surfaces being articulated at an edge joint at their respective inner edges. Each of the surfaces is gently curved and inclines downwardly and inwardly from its outer edge and then upwardly and inwardly toward the edge joint. The upper surface of a given member and the lower surface of the next superjacent member cooperate to support and retain a gas entry portion having a gas entry face substantially contiguous but not in perfect contiguity with the outer edges of the surfaces. A liquid is caused to flow forwardly through the liquid entry portions and outwardly from the liquid exit portions while adding to the liquid a granular or fibrous medium subtantially smaller in size than the granular material and substantially larger than the fine particulate matter to be separated and filtered from the liquid to be treated. Surface layer deposits of the medium separate and accumulate at the liquid entry faces. The liquid to be treated is also caused to flow forwardly into and from the panel bed to separate and accumulate deposits of the fine particulate matter on the surface layer deposits. Thereafter, the liquid entry faces would be cleaned and renewed by the pulseback technique. Then a liquid would be caused suddenly to flow forwardly into the liquid entry portions of the granular material bed to cause a body movement of the liquid entry portions inwardly and coordinately to decrease the porosity of the bed and thereby to move the liquid entry faces a small distance away from perfect contiguity with the outer edges of the upper and lower surfaces of the members. The cycle of operation would then be repeated. The first liquid, that contains the fine granular or fibrous medium to be deposited at liquid entry faces, and the second liquid, the one to be treated, are sometimes advantageously one and the same. In such a case, the granular or fibrous medium is preferably added during an early part of the treating time period, although sometimes satisfactory performance is obtained while adding the medium throughout the liquid-treating time period. The aforementioned small distance is suitably about one- to three-sixteenths of an inch, leaving the liquid entry faces substantially contiguous with the outer edges of the two surfaces of the supporting members but not in perfect contiguity. The abovedescribed arrangement and procedure have the advantage that the surface layer deposits have little tendency to spall from the liquid entry faces during the liquid treatment.

If the panel bed is subject to intense vibrations, the aforementioned surface layer deposits are sometimes advantageously reinforced by admixing the granular or fibrous medium with a reticulating agent. This agent establishes bonds between adjacent particles of the fine medium at at least a fraction of the points of contact among the particles of the medium to provide a reticular network of the particles thereby reinforcing the surface layer deposits and rendering them less vulnerable to spalling under influence of vibrations or sudden changes in pressure difference across the deposits caused by sudden changes in liquid flow. For a discussion of reticulating agents, see the aforementioned co-pending application number 6, "Precoating Panel Bed for Filtering Aerosol of Micron-Size Particulates", which discussion I incorporate in the instant application by reference. In brief, for example, a cementitious material (preferably a quick-setting cement) or a suspension or emulsion of a sticky material such as asphalt or ethylacrylate are suitable reticulating agents.

SUMMARY OF THE APPARATUS FEATURES OF THE INVENTION

My invention also relates to an improved liquid-solid contactor with a pair of upwardly extending, horizontally spaced-apart, perforate retaining walls, with means for supplying a loose solid particulate material into the space between the walls. There is a plurality of particulate-material support members each adjacent a perforation of the first perforate wall, each member being arranged to extend outwardly from below its adjacent perforation and into an inlet compartment in communication with the perforations of the first wall. The support members support and expose to the inlet compartment a plurality of free surfaces of particulate material, the members being arranged cooperatively to support the particulate material and to retain the material within the space between the walls. A liquid outlet compartment is in communication with the perforations of the second perforate wall. There is an inlet for admitting liquid into the inlet compartment, and an outlet for removing liquid from the outlet compartment. Means are provided for periodically effecting a body movement of the particulate material toward the inlet compartment of at least those portions of the particulate material including the free surfaces and which are retained on the support members. The body movement means comprise means for effecting a transient flow of liquid from the outlet compartment through the perforations of the second of the perforate walls and thence through the particulate material in the space and from the free surfaces in the inlet compartment to produce first a rise and subsequently a fall in the pressure difference between the outlet compartment and the inlet compartment. The body movement means include means for moderating the transient flow so that the aforementioned pressure difference remains greater than the aforementioned critical minimum difference for a time interval less than about 2000 milliseconds and peaks to a top value within not more than about 600 milliseconds after the difference surpasses the critical minimum difference.

When the contactor is to be used to filter particulate dirt from a liquid, a typical support member advantageously has two surfaces articulated at an edge joint substantially adjacent and below the member's respective perforation in the first wall. The lower of the two surfaces is arranged to extend outwardly and downwardly from the edge joint and into the joint compartment, and the upper of the two surfaces is arranged to extend outwardly and upwardly from the edge joint and into the inlet compartment. A line drawn through the outer edge of a typical lower surface and the edge joint of the next subjacent support member advantageously forms an angle less than about 60° from the horizontal.

For countercurrent contacting of a liquid and a granular material, a typical support member advantageously extends outwardly and downwardly in a gentle curve from below its adjacent perforation and then extends further in a gentle curve upwardly and into the inlet compartment. The inner edge of a typical support member is either above the inner edge of the free surface supported by the member or, when below, a line drawn through these edges is preferably inclined at an angle of less than about 45° to the horizontal.

For removal of extremely fine particulate dirt from a liquid, a typical support member advantageously has two surfaces articulated at an edge joint substantially adjacent and below the member's respective perforation in the first wall, each of the two surfaces being arranged to extend outwardly and downwardly in a gentle curve from the edge joint and then to extend further in a gentle curve outwardly and upwardly into the inlet compartment. Means are advantageously provided for suddenly admitting a liquid into the inlet compartment for sudden passage into the free surfaces. Means are also advantageously provided for introducing into a liquid a granular or fibrous medium substantially smaller than the particulate material supplied to the space between the two perforate walls and for supplying this liquid to the inlet compartment. BRIEF DESCRIPTION OF THE DRAWINGS The invention will be more particularly described in conjunction with the following drawings wherein:

FIG. 2 is a top view of the panel bed of FIG. 1;

FIG. 3 is a schematic diagram illustrating use of the invention to filter particulate dirt from a liquid.

DESCRIPTION OF THE PREFERRED EMBODIMENTS

Figure 1:
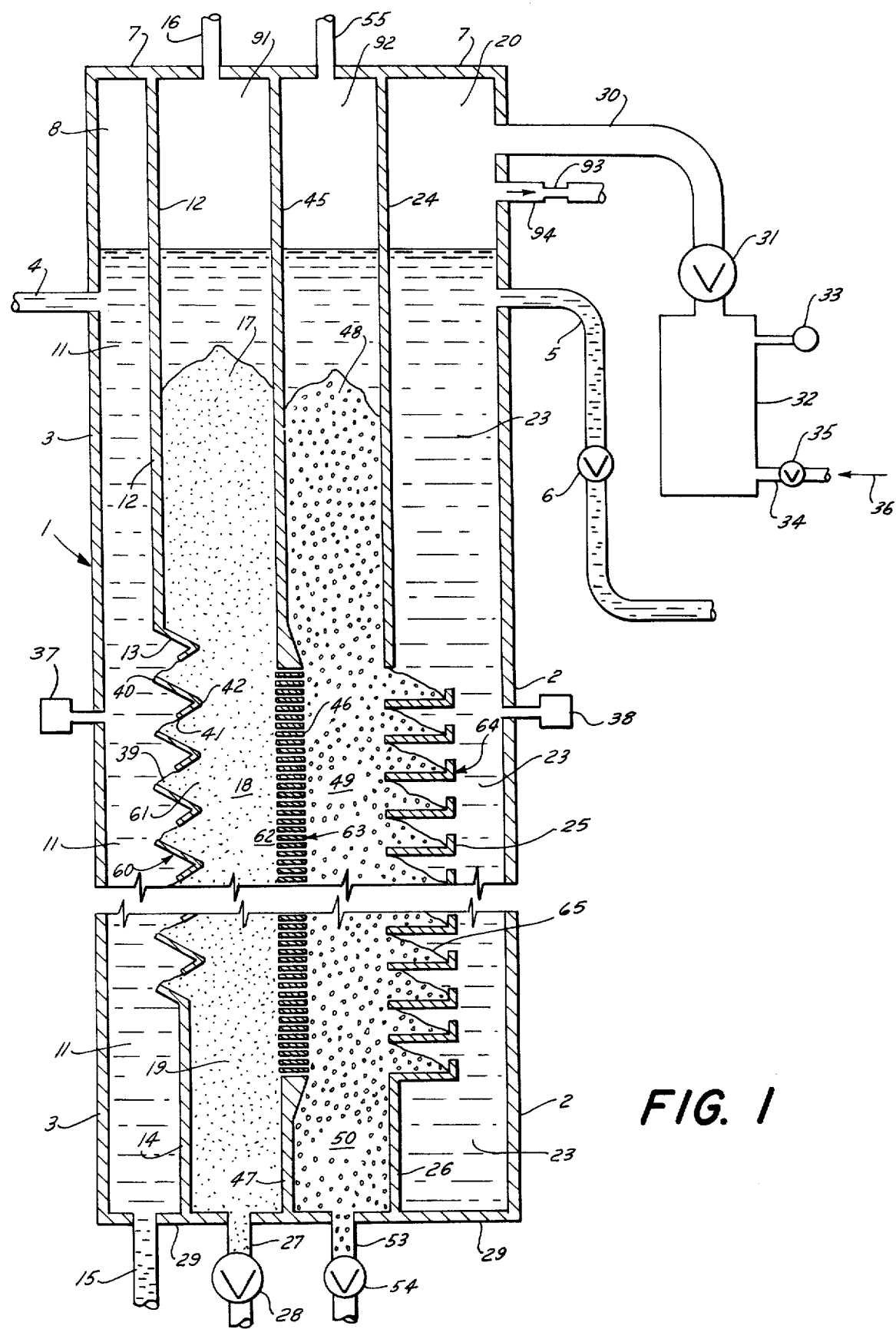
FIG. 1 is a vertical section view of a preferred contacting panel, with a bed of sand.

In the several figures, like reference numerals refer to like parts having like functions. In FIG. 1, the panel bed liquid-solid contactor 1 comprises a casing of rectangular cross-section having opposed side walls 2 and 3 and top plate 7 and bottom plate 29. Opposed edge walls 51 and 52 are to be seen in FIG. 2, a top view. A generally vertical bed of granular contact solid 18 is within the casing and retained by vertically extending, horizontally spaced-apart, perforate walls 60 and 63. Granular material is supplied by gravity feed to bed 18 from supply bed 17, retained between imperforate walls 12 and 45. Additional granular material may be added to bed 17 from pipe 16, leading from supply hopper 75 (to be seen in FIG. 3) via valve 74. Granular bed 18 may be drained, if desired, via space 19 between walls 14 and 47, normally filled with static granular solid, by means of pipe 27 and valve 28. Perforate wall 63 comprises a series of horizontal louvers or slats 46 mounted one above another in a structure resembling subway grating and narrowly spaced apart in the vertical direction. Horizontally spaced-apart from wall 63 is perforate wall 64 comprising a series of generally horizontal louvers or slats 25 also mounted one above another. Granular material bed 49, comprising material considerably coarser in size than the granular contact solid of bed 18, and also preferably denser than the contact solid, is retained by perforate walls 63 and 64, and is supplied from supply bed 48, retained between imperforate walls 45 and 24. Additional granular material of the coarser character may be added to bed 48 from pipe 55, leading from supply hopper 80 (seen in FIG. 3) via valve 79. Granular bed 49 may be drained, if desired, via space 50 between walls 47 and 26, normally filled with static granular material, by means of pipe 53 and valve 54. Walls 12, 60, 14, 3, 51, and 52, bottom 29, and top 7 enclose liquid entry compartment 11, to which liquid to be treated is supplied from pipe 4. Walls 24, 64, 26, 2, 51, and 52, bottom 29, and top 7 enclose liquid exit compartment 23, from which liquid leaves via pipe 5. Louvers 25 cooperate to support liquid exit surfaces 65 of bed 49. Gas space 8 occupies a portion of liquid inlet compartment 11, above the surface of the liquid being treated. Similarly, gas space 20 occupies a part of liquid exit compartment 23, above the surface of treated liquid. Gas spaces 91 and 92 appear in upper spaces between walls 12 and 45 and between walls 45 and 24 respectively.

Perforate wall 60 comprises a series of members 13. A typical member 13 has an upper surface with outer edge 40 and inner edge 42 in respect to granular bed 18, and cooperating therewith a lower surface with outer edge 41 and inner edge 42, the two inner edges being articulated together in an edge joint. The perforations of wall 60 are to be considered as being formed between respective inner edge joints 42 of adjacent members 13. The members 13 are mounted in a manner such that they cooperate to support liquid entry portions 61 of bed 18, viz., the angle of a line drawn through edge 41 of a given member and edge 40 of the next subjacent member should preferably be less than about 25° from the horizontal, an angle less than the angle of repose of most granular materials that might preferably be employed in bed 18. It will be seen that the liquid entry portions 61 are transversely disposed, upwardly spaced, and separated by the interposed supporting members 13, the liquid entry portions having liquid entry faces 39 that are substantially contiguous with outer edges 40. A line drawn through edge 41 of a typical member 13 and edge joint 42 of the subjacent member 13 is inclined at an angle less than about 60° from the horizontal.

Liquid exit portions of bed 18 are seen at 62 in FIG. 1, and are spaced from edge joints 42.

Pipe 30 connects gas space 20 with tank 32, quick-opening valve 31 being provided to isolate tank 32 from space 20. Tank 32 is connected to source 36 of gas under pressure via line 34 and valve 35. Pressure gauge 33 is provided to help adjust the pressure of gas in tank 32. Space 20 is provided with pipe 94 leading to gas flow resistance 93, suitably an orifice, to bleed off gas from space 20 as required.

In operation of panel bed 1 as a liquid filter, for example, the panel bed is initially charged with granular material, such as quartz sand, from line 16, filling spaces 19, 18, and 17 as shown in FIG. 1. Spaces 50, 49, and 48 are filled with a second, coarser granular material from line 55. Panel bed 1 is connected to a process 71 producing a dirty liquid via liquid-entry pipe 4, as shown in FIG. 3, and the liquid is caused to flow forwardly through panel bed 1 by opening valve 6 in pipe 5. If process 71 does not supply liquid at sufficient pressure to cause the liquid to flow readily through panel bed 1, optional pump 72 is conveniently provided to carry liquid from pipe 5 to line 73 for conducting clean liquid from the system. Periodically, tank 32 is filled with gas at pressure from supply 36, valve 35 is closed, and valve 31 is opened quickly to produce the specified transient reverse flow of liquid from compartment 23 to compartment 11, a sudden increase in gas pressure in space 20 driving liquid from compartment 23 toward compartment 11. Thereafter, the gas introduced into space 20 bleeds away from the space through resistance 93, restoring the pressure in space 20 to normal. Pipe 15 is provided to withdraw accumulated dirt and granular filter medium spilled from surfaces 39 by the reverse transient flow of liquid. Sometimes it is preferable to close valve 6, interrupting the flow of liquid being treated, before opening valve 31, in order that liquid in compartment 11 is quiet during the short interval in which dirt and filter medium are settling downward through space 11 toward pipe 15. In such a case, valve 6 would be reopened after this short interval in order to resume liquid treatment by filtration of the dirt by the freshly cleaned and renewed bed 18.

As seen in FIG. 3, pipe 15 advantageously conducts the spilled solids to means 77 for separating dirt and granular medium, for example, by screening or washing the dirt away from the granular medium. Pipe 78 is provided for withdrawal of dirt from means 77, and pipe 76, for return of granular medium to supply hopper 75.

As fluid dynamicists will readily appreciate, for any given porosity of bed 18 and bed 49, there is a wide range of combinations of size of valve 31, speed of its opening, size of tank 32, pressure therein, length and diameter of line 30, and size of space 20 that will yield the specified reverse transient flow of liquid. The length of time the flow sustains a pressure difference between 23 and 11 beyond a specified minimum pressure difference and the time at which the pressure difference surpasses a specified difference and the further elapsed time before the pressure difference peaks to a top value — these are functions of the aforementioned variables (including the porosity of bed 18 and bed 49) together with lesser influence arising from dimensions of spaces 8, 91, and 92. Competent fluid dynamicists will be able to calculate such time lengths as will comport with the specifications herein, given knowledge of the critical minimum difference aforementioned.

The critical minimum pressure difference is easily determined by an experiment in which liquid is caused to flow in the reverse direction across the panel bed and pressure readings are taken to determine the pressure difference at which localized spills just appear at, usually, a few of the liquid entry faces of the panel bed, although sometimes at first only at one face. For a given configuration of walls 60, 63, and 64 and for given granular media in beds 18 and 49, suitable ranges of the aforementioned variables are most easily determined experimentally, as can be done on a relatively small scale. In experiments of this type I have conducted, I have for greater convenience installed rapid-response transducers 37 and 38, as shown in FIG. 1, to report instantaneous pressure readings from compartments 11 and 23 respectively. Those skilled in the art will recognize that transducers 37 and 38 need not be provided routinely in embodiments of the invention.

I have conducted a large number of experiments with a panel bed similar to that seen in FIG. 1, using a number of valves 31 of various sizes and various speeds of opening, a number of reservoirs 32 of various volumes and with use of a range of pressure levels from supply 36, and with a range of the volume provided in space 20. I have followed the instantaneous pressure in space 23 and space 11 with rapid-response transducers 38 and 37 respectively, recording data from the transducers by a polaroid camera directed toward an oscilloscope displaying the data. I have also conducted experiments with steady backflow of liquid from compartment 23 to compartment 11.

I obtained data covering the widest range of conditions using 30–40 mesh (U.S. Standard) quartz sand in bed 18 and 49 (for convenience of the experimentation, wall 63 was removed). For the experimental liquid, I used water.

A steady backflow of liquid invariably produced a localized spill from one or more of the liquid entry surfaces 39 of bed 18. The spill originated at an edge 41 and consisted of sand driven by the liquid toward this edge along the lower surface of the member 13, i.e., from edge 42 to edge 41 of the member. For a diagram illustrating such a localized spill of sand, see FIG. 4 of my aforementioned co-pending application number 2, "Filtering Dusty Gas in Improved Panel Bed", which I incorporate in the instant application by reference. The pressure difference from compartment 23 to compartment 11 for a reverse steady flow of water that just initiated a spill from a few of the liquid entry surfaces 39 was about 3 centimeters of water (cm), and this is accordingly the critical minimum pressure difference of the instant invention for the experimental arrangement described above.

In contrast, with release of air from a relatively small tank 32 into a relatively small space 20, I observed substantially perfect body movement of sand bed 18 toward liquid entry surfaces 39, with spill of sand from these surfaces for a wide range of air pressure in tank 32. For a diagram illustrating such body movement, see FIG. 6B of my aforementioned co-pending application number 2, which I incorporate in the instant application by reference. At the highest pressure that I examined for tank 32, the reverse transient flow of liquid induced by the release of air into space 20 caused the pressure difference from space 23 to space 11 to remain greater than the critical minimum pressure difference of 3 cm for about 100 milliseconds. The pressure difference peaked to a top value of about 114 cm to about 25 milliseconds after the pressure difference surpassed 3 cm. At the lowest pressure examined for tank 32 in the particular test arrangement, the pressure difference peaked to about 22 cm in about 25 milliseconds and remained greater than 3 cm for about 60 milliseconds.

Using the same relatively small tank 32 but considerably increasing the volume of space 20, I observed good body movement of the sand toward faces 39 at both a high pressure in tank 32 (where the pressure difference peaked to about 32 cm in about 40 milliseconds and remained greater than 3 cm for about 160 milliseconds) and a low pressure in tank 32 (where the pressure difference peaked to about 4 cm in about 30 milliseconds and remained greater than 3 cm for about 50 milliseconds).

Unlike the case of puffback cleaning of a gas-treating panel bed (see my aforementioned co-pending applications 1, 2, and 3), I could not distinguish a second critical minimum difference, larger than 3 cm, required to just initiate the desired body movement. This movement, as near as I could judge, was initiated whenever the transient reverse flow of liquid caused the pressure difference to surpass 3 cm, the difference for a steady backflow of liquid to produce a localized spill from faces 39. It is believed that the shear strength of a sand saturated with a liquid does not depend significantly upon the rate of the loading (see *Transactions of the American Society of Civil Engineers*, volume 128, part 1, pages 1553–1587, 1963), and this circumstance is probably related to my discovery that the critical minimum difference to initiate a localized spill by a steady backflow of liquid and the critical minimum difference to initiate a body movement by a transient pulseback of liquid are not distinguishable by ordinary means.

In experiments to explore the time limits on the transient reverse flow of liquid, I determined that a flow was satisfactory that produced a reverse pressure difference beyond 3 cm for about 1200 milliseconds and peaked to a top value in about 400 milliseconds after passing 3 cm. Similar results, not quite so good but still satisfactory, were obtained at times of 1600 and 400 milliseconds respectively. Times of 2800 milliseconds and 400 milliseconds respectively produced a curious effect: first, there was a satisfactory body movement, but this was followed almost at once by a much larger localized spill of sand from surfaces 39 near the top of the panel, spoiling the overall movement of sand bed 18 from standpoint of a desire to clean and renew all of the surfaces 39 through the agency of a substantially uniform body movement of bed 18 toward each of these surfaces. Times of 2600 milliseconds and about 700 milliseconds respectively produced simply the undesired localized spill from upper surfaces 39. On the other hand, at times of 3000 milliseconds and about 600 milliseconds respectively, I again saw a trace of body movement early in the spill only to see it later overwhelmed by much larger localized spills near the top of the panel bed 1. As a result of these and other experiments, I have concluded that time intervals of about 2000 milliseconds and about 600 milliseconds respectively represent approximate upper limits for acceptable performance, but I prefer considerably shorter time intervals. For operation of panel bed 1 to filter particulate dirt from a liquid, I prefer time intervals shorter than about 200 milliseconds and 60 milliseconds respectively.

I have found that I can obtain a satisfactory pulseback by connecting compartment 23 quickly to a source of water at a high pressure, such as about 100 pounds per square inch gauge, by quickly opening a valve in a pipe connection between compartment 23 and the high pressure water source, and thereafter closing the valve within a time interval less than about 2000 milliseconds.

A practical minimum time interval for a successful pulseback from the operation of the arrangement of FIG. 1 appears to be on the order of a second or so, given the practical requirements for location of tank 32 and size and length of pipe 30 to conduct air from tank 32 to space 20. It should be noted, however, that one might, for example, achieve an extremely short, but nevertheless non-zero, time interval by eliminating space 20 and the perforations in wall 2 for pipes 30 and 94 and by mounting a large number of blank cartridges on wall 2 and by firing them simultaneously to discharge gas explosively into space 23 and by thereafter venting the gas from the top of space 23; or one might provide an arrangement whereby wall 2 might be displaced almost instantaneously toward wall 64 or other mechanical-diaphragm arrangement for displacing liquid from space 23 to space 11; or one might set off an electrical discharge in the liquid in space 23 to create vapor and displace liquid from space 23 to space 11; or one might connect space 23 ever so briefly to a source of water at an extremely high pressure.

Immediately after the pulseback, the granular material of bed 18 moves downward to make good losses of material from the liquid entry faces 39. The above-specified angle of less than about 60° ensures that granular material a short distance inward from edge 41 will not participate in the downward movement, carrying down with it any dirt that may have penetrated this short distance into bed 18, because a line drawn through a given edge joint 42 of a member 13 and passing upward and outward (i.e., leftward in FIG. 1) at the angle of the failure plane of the granular material (generally between about 65° and 70° for most material that might advantageously be used) will strike the lower surface of the next superjacent member 13 at a point inward from edge 41 of this member.

A wide range of granular materials are suitable for practicing the invention. In general, I prefer for bed 18 a material larger than about 100 mesh. In an application for filtration, the size of the material depends upon the size of particulate matter to be filtered. For filtering fine particulate matter, I prefer a quartz sand substantially smaller than about 10 mesh, and sometimes preferably smaller than 20 mesh.

With 20–30 mesh or 40–50 mesh sand, for example, present in bed 18, a sand of about 10–14 mesh is suitable for bed 49. The spacing of louvers 46 in wall 63 is preferably comparable to the dimensions of the granular solid present in bed 49, so that this solid does not participate in the mass movement brought about by pulseback, thereby penetrating bed 18.

For operation at high liquid throughputs, it will be advantageous to provide a fourth perforate wall, with closely spaced louvers, so that three grades of sand can be used, the middle grade being retained between two walls like wall 63 and separating bed 18 and bed 49. The three grades, for example, could advantageously be 40–50 mesh in bed 18, 10–14 mesh in the middle bed, and 4–8 mesh in bed 49.

If the concentration of matter to be filtered is high and especially if it displays a wide range of size, the liquid would advantageously be caused to flow across a series of panel beds having progressively smaller granular materials in their liquid entry portions, as hereinbefore described. In reference to FIG. 1, a second panel bed could be placed at approximately the location of wall 2 in the drawing, and space 23 would be simply a space across which the liquid would flow horizontally from liquid exit faces 65 toward the liquid entry faces of the new panel bed. Tank 32 would remain in communication with space 23 and pulseback of bed 18 would be conducted as hereinbefore described. A similar tank (suitably the same tank 32) with similar fittings would be put into communication with the liquid exit compartment of the new panel bed, and material spilled into space 23 by pulseback of the new panel bed would be removed at the bottom of space 23 by a new connection through bottom 29.

Figure 4:
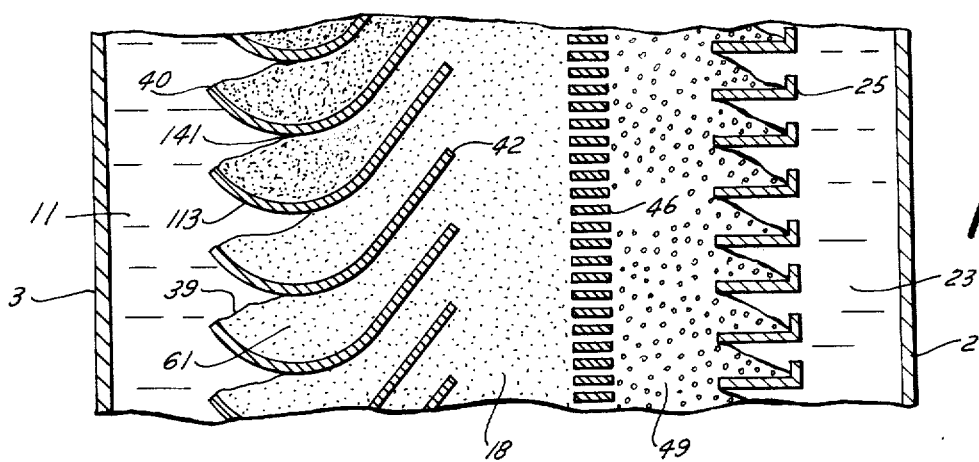
FIGS. 4, 5, 6, and 7 illustrate alternative designs of support members for the liquid entry face of the panel bed.
Figure 5:
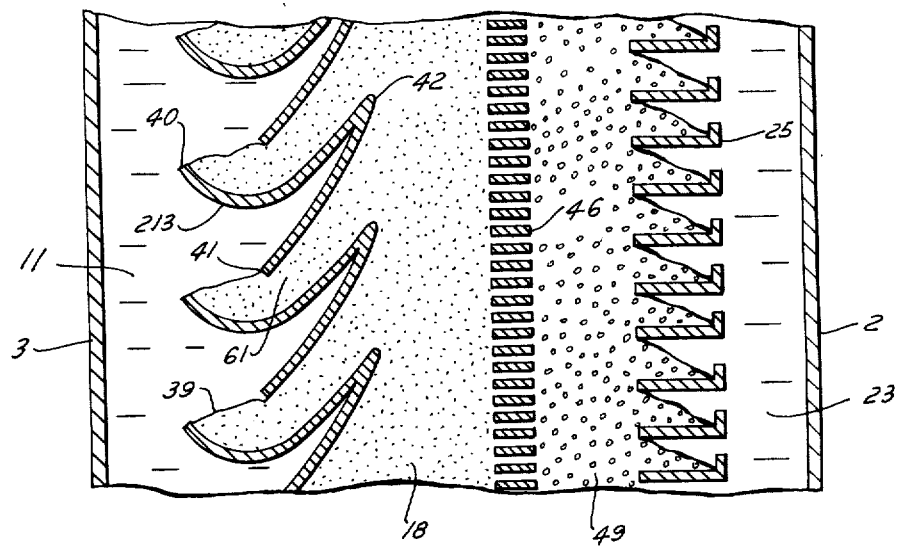
Figure 6:
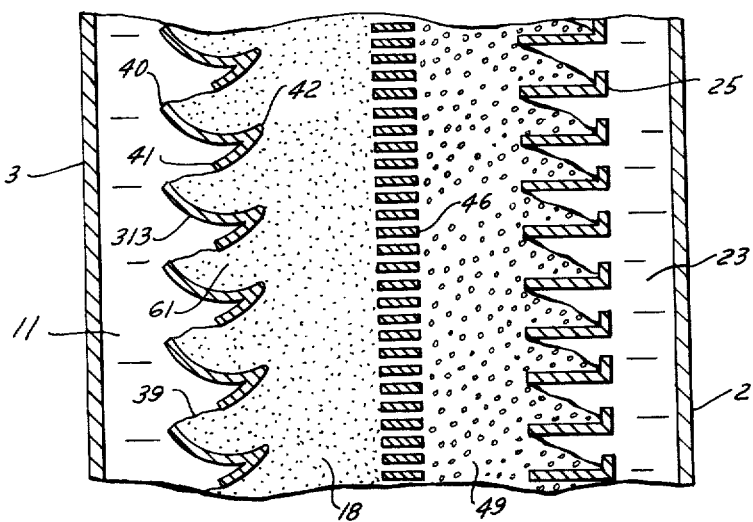

FIGS. 4, 5, and 6 illustrate additional designs 113, 213, and 313 respectively for the support members of perforate wall 60 that may sometimes be preferred. The surface between edge 40 and edge 42 in both FIGS. 4 and 5 is gently curved and inclines downwardly and inwardly from its outer edge and then upwardly and inwardly toward its inner edge. In FIG. 4 the members 113 are mounted to cooperate to support liquid entry portions 61, viz., a line drawn through edge 40 of a given member 113 at an angle of about 25° from the horizontal and upwardly toward the next superjacent member 113 should intersect the superjacent member, so that liquid entry surface 39 borne by the given member 113 will display an inner edge 141 in contact with the superjacent member. In FIG. 5 support member 213 has an upper and a lower surface articulated at an edge joint at their inner edges 42. The outer edge of a typical liquid entry face 39 is substantially contiguous with the outer edge 40 of the upper surface of the typical member 213 supporting the liquid entry face. The inner edge of the typical liquid entry face 39 is substantially contiguous with the outer edge 41 of the lower surface of the superjacent member. Designs of the general type illustrated by FIGS. 4 and 5 are advantageous where countercurrent contacting of a liquid and a granular material is desired, as, for example, in a heat exchange between the two materials, or in the adsorption of unwanted colored matter from a liquid by an activated carbon, or in removal of straight-chain aliphatic hydrocarbons from branched-chain aliphatic hydrocarbons by adsorption by molecular sieves.

In operation of a panel bed liquid-solid contactor fitted with support members like those exemplified by members 113 and 213 of FIGS. 4 and 5 respectively and used for countercurrent liquid-solid contacting, I prefer that the reverse pressure difference caused by pulseback remain greater than the critical minimum difference for a time interval less than about 400 milliseconds, and that the reverse pressure difference peak to a top value within about 120 milliseconds after it surpasses the critical minimum difference.

In operation of the panel bed 1 of FIG. 1 or those or FIGS. 4, 5, and 6, it is preferable that valve 6 be opened slowly at the start of each liquid-treating cycle, so that a sudden rush of liquid into the bed 18 from compartment 11 via suraces 39 does not compact the bed and cause gaps to appear beneath the surfaces extending from edges 41 to edges 42 of the members 13, 113, 213, and 313 respectively.

It should be noted that the porosity of granular material bed 18 of the aforementioned panel beds should be brought initially to the uniform porosity appropriate for the pulseback intensity selected for operation. Specifically, it is sometimes advantageous to subject the panel bed initially to a pulseback of greater intensity than that contemplated for subsequent operation, or to discharge a controlled quantity of granular material from the bottom of the panel bed.

Figure 7:
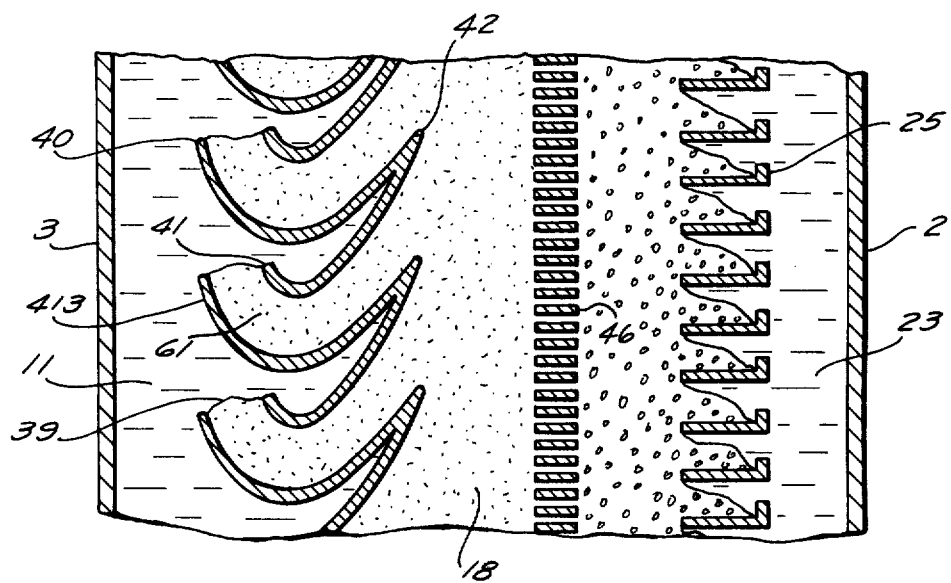

FIG. 7 illustrates an alternate design 413 for the support member of perforate wall 60 that permits exploitation of the aforementioned tendency for a sudden rush of liquid into bed 18 from compartment 11 to compact the bed and to shift surfaces 39 inward, and also sometimes to spall material from surfaces 39. In the arrangement of FIG. 3, and with a panel bed using support members 413 in place of the panel bed 1, a sudden rush of liquid into bed 18 from compartment 11 can be provided by closing valve 406, opening valve 6, and briefly connecting pipe 4 to source 408 of liquid at high pressure by quickly and briefly opening valve 409. The transient surge flow thereby created from compartment 11 to compartment 23 will cause surfaces 39 of liquid entry portions 61 of bed 18 in FIG. 7 to move a small distance inward and to move the surfaces away from perfect contiguity with edges 40 and 41. The distance that surfaces 39 move inward is a function of the size of the granular material of bed 18, the intensity of the surge, and the porosity of bed 18 just before the inward surge of liquid (this last variable, in a repeated cyclic operation with repeated pulseback cleanings, being a function of the intensity of the pulseback regularly employed). It is preferable and usually practicable to move liquid entry faces inward by a distance between about one- to three-sixteenths inch. For the practical effect of a subsequent pulseback cleaning and renewal of liquid entry faces 39, the faces remain substantially contiguous with edges 40 and 41, although not in perfect contiguity, after their inward displacement by such a distance by the inward surge flow of liquid. That is to say, pulseback cleaning may readily be moderated to overcome such a small displacement, the body movement of bed 18 advancing the liquid entry faces 39 easily through this distance and then further to produce the desired spill of material from the faces, thereby cleaning and renewing the faces.

The arrangement of FIG. 7 is particularly advantageous if an ultra-fine particulate dirt is to be filtered from a liquid, such as the micron-size particles of inorganic matter often present in a liquid fuel made from coal, that often run as small as 1 micron and even smaller. If such dirt is to be filtered, it is advantageous to add a granular or fibrous medium to liquid flowing in pipe 4 forwardly into a panel bed using support members 413 in place of the panel bed 1. The granular or fibrous medium is preferably of a size intermediate between that of the dirt to be filtered and the granular material in bed 18. For example, if bed 18 consists of quartz sand of 20–30 mesh, or preferably 20–60 mesh, the granular medium is preferably smaller than about 120 mesh. If the ultra-fine dirt is present in a low concentration, fly ash from the combustion of pulverized coal is a readily available, convenient granular medium to use. If the dirt is present at high concentration, a conventional filter aid for liquid filtration, such as perlite or vermiculites or asbestos flocs or paper pulp or Kieselguhr or diatomaceous earth or other substances of high porosity and low specific gravity. [For a discussion of such conventional filter aids, see *Chemical Engineers' Handbook*, John H. Perry, editor, McGraw-Hill, third edition, 1950, pages 969–970; notice particularly that decolorizing carbons and activated clays are sometimes used to provide both a filter aid and a clarifying agent to decolorize liquids, such as oils and fats, and these granular media will sometimes be preferred for use in the arrangement of FIG. 7.]

FIG. 3 illustrates an arrangement for adding the medium to liquid flowing in pipe 4. The medium may be supplied from source 407 to hopper 401 and furnished therefrom to pipe 4 via pipe 403 and valve 402. At least a small flow of a liquid from source 404 via valve 405 is advantageously added to pipe 403 to help convey the medium into pipe 4. The liquid carrying the medium into the panel bed may sometimes advantageously be the liquid to be cleaned of dirt, valve 406 in pipe 4 being open, and the medium being put down in the surface layer deposits either during an early part of the liquid-treating cycle between two consecutive pulseback cleanings or throughout the liquid treatment. Alternatively, the liquid carrying the medium into the panel bed may be a second liquid supplied in an appropriate amount from source 404, valve 405, and pipe 403; in this alternative, valve 406 is closed while the surface layer deposits are being put down.

The panel bed using the members 413 of FIG. 7 with surface layer deposits of a granular or fibrous medium to filter ultra-fine particulate dirt from a liquid works best if it is mounted to avoid vibrations of an intensity to spall the surface layer deposits from liquid entry faces 39. If this is not possible, or if there is danger of pressure fluctuations that might create momentary pressure difference in the reverse direction, from compartment 23 to compartment 11, it would be advantageous to provide for sufficient bonds between adjacent particles of the fine granular or fibrous medium to produce a reticulated network of particles in three dimensions. The bonds need not be very strong, but only just strong enough to provide the network with sufficient strength to resist spalling by vibrations of the type to be encountered or by typical expected change and rate of change in flow rate and resulting change in pressure drop across the reticulated network deposit. For each anticipated situation, the strength and number of the bonds are best determined by adjustment to the specific operating conditions, it being within the expected skill of the operator to enhance reticulation if experience shows loss of medium by spalling in operation or loss of coherency of the surface layer deposits and to continue adjusting the extent of reticulation until the minimum extent just desirable has been determined.

A suitable reticulating agent is a finely divided suspension or emulsion of a sticky substance, preferably highly viscous and preferably also viscoelastic, in a liquid. The suspension or emulsion is preferably introduced from high pressure liquid source 408 via valve 409 at a velocity to mix intimately with liquid from source 404 supplied via valve 405. Tar or asphalt or pitch, glycerine, polyolefins (such as polybutadiene and polyisoprene), polyacrylics (such as polymethylmethacrylate), polyacrylamides (including those with cross-linking), ethylacrylate (including the cross-linked variety), sodium silicate, and even many common glues are suitable sticky substances for providing from source 408 in a suspension or emulsion of a liquid (selected of course to be compatible with the sticky matter selected for use, and preferably a similar liquid from the chemical standpoint as the liquid to be filtered of dirt). Polymerizable as well as polymerized materials may be used when they polymerize, preferably quickly, to form a sticky substance.

If the liquid to be filtered is water, a hydraulic cement is a suitable reticulating agent, preferably a cement that sets relatively quickly.

Reinforcing the surface layer deposits also offers the broad advantage that higher flow rates may be used during the filtration.

When a liquid fuel of high gravity and of ordinarily high viscosity is to be filtered to remove fine particulate dirt, such as a heavy synthetic fuel oil made by hydrogenating coal or lignite at high pressure such as about 1000 to 2000 pounds per square inch and at a temperature between about 800° and 850° F, it is advantageous that the liquid fuel be saturated with carbon dioxide gas at a high pressure, such as 500 to 1000 pounds per square inch, in order to reduce the liquid fuel's viscosity and to ease its passage through the panel bed filter.

It will be understood that when granular material is first charged to bed 18 in the design of FIG. 7, it will be necessary to apply several pulsebacks to advance liquid entry surfaces to positions 39 where they are substantially contiguous with edges 40 and 41, before use of the panel bed according to the invention.

I prefer that the curvature of the surface of the support member 113 of FIG. 4 and of each of the surfaces of the support members 213, 313, and 413 of FIGS. 5, 6, and 7 respectively be sufficiently gentle so that the radius of curvature nowhere is less than about five times the dimension of the largest particle present in the liquid-treating granular material.

The foregoing descriptions have been directed to a single panel bed to facilitate understanding my invention. In an actual installation treating a large throughput of liquid, it might be desirable to have a number of panels. For example, several panels might be arranged in parallel, with adjacent panels facing in opposite directions, and spaced from one another to form liquid passages therebetween.

Another suitable arrangement of the panel bed would be to build each of walls 60, 63, and 64 to form a circle or a square or a hexagon when viewed in plan, so that panel bed 18 encloses one or the other of the space 11 or the space 23.

I do not wish my invention to be limited to the particular embodiments illustrated in the drawings and described above in detail. Other arrangements will be recognized by those skilled in the art. Liquid exit portions 62 of bed 18 may sometimes preferably be retained by an arrangement other than that shown in FIGS. 1 and 4 through 7. Suitable arrangements have been disclosed and discussed in my aforementioned co-pending applications, especially 1, 3, and 4. For example, the liquid exit portions 62 might be retained by a wire mesh screen; or by combination of a wire screen and a felt cloth; or by a sintered porous ceramic plate; or, if the granular material in bed 18 is sufficiently coarse and the liquid velocity into the bed is below that velocity which would carry away the granular material, by a column of widely spaced louvers, such as wall 64. Those skilled in the art will also recognize purposes other than those discussed herein which the invention can advantageously serve.

I claim:

1. A method of contacting liquid and granular material with each other to effect treatment of at least one of them, comprising:
    a. arranging granular material in a panel bed having a plurality of transversely disposed upwardly spaced liquid entry portions separated by interposed supporting members having outer and inner edges with respect to the bed wherein said liquid entry portions have liquid entry faces substantially contiguous with said outer edges and wherein said bed has liquid exit portions spaced from said inner edges;
    b. forwardly flowing liquid in a substantially continuing flow through the liquid entry portions of the granular material bed and outwardly from the liquid exit portions to effect treatment of one of said liquid and granular material;
    c. thereafter causing a transient flow of liquid to move in the direction in reverse to the flow of said liquid in (b);
    d. said transient reverse flow producing first a rise and subsequently a fall in the pressure difference between said liquid exit portions and said liquid entry portions, said difference produced by said transient reverse flow remaining greater than a critical minimum difference for a non-zero time interval less than about 2000 milliseconds, said critical difference being that difference at which a steady flow of liquid in said reverse direction just produces a localized spill of granular material from said liquid entry faces, and said difference produced by said transient reverse flow peaking to a top value within not more than about 600 milliseconds after said difference surpasses said critical minimum difference, said transient reverse flow causing a body movement of the granular material toward said liquid entry faces to spill a portion of the granular material from the bed; and
    e. supplying fresh granular material to said panel bed to replace material spilled from said liquid entry faces.

2. The method of claim 1 in which said time interval is less than about 200 milliseconds and in which said difference peaks to a top value within no more than about 60 milliseconds after said difference surpasses said critical minimum difference.

3. The method of claim 1 in which said treatment removes a chemical constituent from a liquid by absorption of said constituent by an active solid.

4. The method of claim 1 in which said treatment removes a chemical constituent from a liquid by adsorption of said constituent by an active solid.

5. The method of treating a liquid involving the separation and removal of particulate matter by means of a filter of granular material which comprises
    a. arranging the granular material in a filter bed having a plurality of transversely disposed upwardly spaced liquid entry portions separated by interposed members having outer and inner edges with respect to the filter bed wherein said liquid entry portions have liquid entry faces substantially contiguous with said outer edges and wherein said filter bed has liquid exit portions spaced from said inner edges;

b. forwardly flowing liquid to be treated in a substantially continuing flow during its treatment through the liquid entry portions of the granular material bed and outwardly from the gas exit portions to separate and accumulate particulate material at said liquid entry faces;

c. causing a transient flow of liquid to move in the direction in reverse to the flow of said liquid in (b);

d. said transient reverse flow producing first a rise and subsequently a fall in the pressure difference between said liquid exit portions and said liquid entry portions, said difference produced by said transient reverse flow remaining greater than a critical minimum difference for a non-zero time interval less than about 2000 milliseconds, said critical difference being that difference at which a steady flow of liquid in said reverse direction just produces a localized spill of granular material from said liquid entry faces, and said difference produced by said transient reverse flow peaking to a top value within not more than about 600 milliseconds after said difference surpasses said critical minimum difference, said transient reverse flow causing a body movement of the granular material toward said liquid entry faces to spill a portion of the granular material and accumulated particulate matter from the bed; and e. supplying fresh granular material to said granular material bed to replace material spilled from said liquid entry faces.

6. The method of claim 5 in which said time interval is less than about 200 milliseconds and in which said difference peaks to a top value within not more than about 60 milliseconds after said difference surpasses said critical minimum difference.

7. The method of claim 5 in which said forward flow of said liquid undergoing said treatment is interrupted between steps (b) and (c) and is resumed following step (e).

8. The method of claim 5 wherein said liquid undergoing said treatment in step (b) is a liquid fuel produced from a bituminous coal or subbituminous coal or lignite and wherein said liquid contains finely divided inorganic matter originally present in said coal or lignite and wherein said treatment substantially removes said inorganic matter from said liquid fuel.

9. The method of claim 5 in which said liquid undergoing treatment in step (b) is waste water from the processing of a mineral containing asbestiform matter and wherein said treatment substantially removes finely particulate asbestiform matter from said waste water.

10. The method of claim 5 in which said granular material is smaller than about 10 mesh and larger than about 100 mesh.

11. The method of claim 5 including a step of placing on said liquid entry faces surface layer deposits of a granular or fibrous medium substantially smaller than about 120 mesh.

12. The method of claim 11 in which said granular medium is fly ash from the combustion of pulverized coal.

13. A method of contacting liquid and granular material with each other to effect treatment of at least one of them, comprising:

a. arranging granular material in a panel bed having a plurality of transversely disposed upwardly spaced liquid entry portions separated by interposed supporting members having outer and inner edges with respect to the bed wherein said liquid entry portions have liquid entry faces with outer edges substantially contiguous with said outer edges of said supporting members and wherein a supporting member is gently curved and inclines downwardly and inwardly from its outer edge and then upwardly and inwardly toward its inner edge and wherein a surface passed through the inner edge of the liquid entry face of a given supporting member and inclined downwardly and inwardly at an angle of 45° to the horizontal intersects said given supporting member and wherein said bed has liquid exit portions spaced from said inner edges of said supporting members;

b. forwardly flowing liquid in a substantially continuing flow through the liquid entry portions of the granular material bed and outwardly from the liquid exit portions to effect treatment of one of said liquid and granular material;

c. thereafter causing a transient flow of liquid to move in the direction in reverse to the flow of said liquid in (b);

d. said transient reverse flow producing first a rise and subsequently a fall in the pressure difference between said liquid exit portions and said liquid entry portions, said difference produced by said transient reverse flow remaining greater than a critical minimum difference for a non-zero time interval less than about 2000 milliseconds, said critical difference being that difference at which a steady flow of liquid in said reverse direction just produces a localized spill of granular material from said liquid entry faces, and said difference produced by said transient reverse flow peaking to a top value within not more than about 600 milliseconds after said difference surpasses said critical minimum difference, said transient reverse flow causing a body movement of the granular material toward said liquid entry faces to spill a portion of the granular material from the bed; and e. supplying fresh granular material to said panel bed to replace material spilled from said liquid entry faces.

14. The method of claim 13 in which said time interval is less than about 400 milliseconds and in which said difference peaks to a top value within not more than about 120 milliseconds after said difference surpasses said critical minimum difference.

15. The method of claim 13 in which said granular material is at a given temperature and said liquid in step (b) is at a different temperature and wherein said treatment effects an exchange of heat between said granular material and said liquid in step (b).

16. The method of treating a liquid involving the removal of a chemical constituent from the liquid, comprising:

a. arranging an active solid in granular form in a panel bed having a plurality of transversely disposed upwardly spaced liquid entry portions separated by interposed supporting members having outer and inner edges with respect to the bed wherein said liquid entry portions have liquid entry faces with outer edges substantially contiguous with said outer edges of said supporting members and wherein a supporting member is gently curved and inclines downwardly and inwardly from its outer edge and then upwardly and inwardly toward its inner edge and wherein a surface passed through the inner edge of the liquid entry face of a given supporting member and inclined downwardly and inwardly at an angle of 45° to the horizontal intersects said given supporting member and wherein said bed has liquid exit portions spaced from said inner edges of said supporting members;

b. forwardly flowing liquid to be treated in a substantially continuing flow during its treatment through the liquid entry portions of the active solid bed and outwardly from the liquid exit portions to effect removal of a chemical constituent from said liquid by adsorption by said active solid;

c. thereafter causing a transient flow of liquid to move in the direction in reverse to the flow of said liquid in (b); and d. said transient reverse flow producing first a rise and subsequently a fall in the pressure difference between said liquid exit portions and said liquid entry portions, said difference produced by said transient reverse flow remaining greater than a critical minimum difference for a non-zero time interval less than about 2000 milliseconds, said critical difference being that difference at which a steady flow of liquid in said reverse direction just produces a localized spill of active solid from said liquid entry faces, and said difference produced by said transient reverse flow peaking to a top value within not more than about 600 milliseconds after said difference surpasses said critical minimum difference, said transient reverse flow causing a body movement of the granular material toward said liquid entry faces to spill a portion of the active solid from the bed; and e. supplying fresh granular material to said panel bed to replace material spilled from said liquid entry faces.

17. The method of claim 16 in which said time interval is less than about 400 milliseconds and in which said difference peaks to a top value within not more than about 120 milliseconds after said difference surpasses said critical minimum difference.

18. The method of claim 16 in which said active solid is selected from the group consisting of Fuller's earth, bauxite, acid-treated clay, bone char, active carbons, alumina, silica gel, ion-exchange resins, molecular sieves, and magnesia.

19. The method of treating a liquid involving the separation and removal of fine particulate matter by means of a filter of granular material which comprises a. arranging a granular material in a panel bed having a plurality of transversely disposed upwardly spaced liquid entry portions separated by interposed supporting members, a said member having an upper and a lower surface each having outer and inner edges with respect to the bed wherein said surfaces are articulated at an edge joint at their respective inner edges and wherein each of said surfaces is gently curved and inclines downwardly and inwardly from its outer edge and then upwardly and inwardly toward said edge joint and wherein the upper surface of a given member and the lower surface of the next superjacent member cooperate to support and retain a said liquid entry portion having a liquid entry face between about 1/16 and 3/16 inch out of perfect contiguity with said outer edges of said upper and said lower surface of said given member, and wherein said bed has liquid exit portions spaced from the inner edge joints of said members;

b. forwardly flowing a liquid through the liquid entry portions of the granular material bed and outwardly from the liquid exit portions while adding to said liquid a granular or fibrous medium substantially smaller in size than said granular material and substantially larger in size than a fine particulate matter to be separated and removed from a liquid to be treated and thereby to separate and accumulate said medium in surface layer deposits at the liquid entry faces of said liquid entry portions;

c. forwardly flowing the liquid to be treated thereby separating and accumulating said fine particulate matter on said surface layer deposits d. causing a transient flow of a clean liquid to move in the direction in reverse to the flow of said liquid in (b) and said liquid in (c);

e. said transient reverse flow producing first a rise and subsequently a fall in the pressure difference between said liquid exit portions and said liquid entry portions, said difference produced by said transient reverse flow remaining greater than a critical minimum difference for a non-zero time interval less than about 2000 milliseconds, said critical difference being that difference at which a steady flow of liquid in said reverse direction just produces a localized spill of granular material from said liquid entry faces, and said difference produced by said transient reverse flow peaking to a top value within not more than about 600 milliseconds after said difference surpasses said critical minimum difference, said transient reverse flow causing a body movement of the granular material toward said liquid entry faces to bring said faces into perfect contiguity with said outer and inner edges of said members and to spill a portion of the granular material and substantially all of said accumulated granular or fibrous medium and said accumulated fine particulate material from the bed;

f. supplying fresh granular material to replace material spilled from said liquid entry portions;

g. causing a liquid to flow suddenly forwardly into the liquid entry portions of the granular material bed to cause a body movement of said liquid entry portions inwardly and to decrease the porosity of said bed and thereby to move said liquid entry faces between about 1/16 and 3/16 inch away from perfect contiguity with said outer edges of said upper and lower surfaces of said supporting members; and h. thereafter repeating the cycle of steps (b) through (g).

20. The method of claim 19 in which said time interval is less than about 400 milliseconds and in which said difference peaks to a top value within not more than about 120 milliseconds after said difference surpasses said critical minimum difference.

21. The method of claim 19 wherein said granular material is smaller than about 10 mesh and larger than about 100 mesh, and said granular or fibrous medium is smaller than about 120 mesh.

22. The method of claim 19 wherein said granular or fibrous medium is admixed with a reticulating agent wherein said reticulating agent establishes bonds between adjcent particles of said medium at at least a fraction of the points of contact among particles of said medium to provide a reticular network of said particles thereby reinforcing said surface layer deposits and rendering the deposits less vulnerable to spalling under influence of vibrations or sudden change in pressure difference across the deposits.

23. The method of claim 19 wherein said liquid undergoing treatment in step (c) is a liquid fuel produced from a bituminous coal or subbituminous coal or lignite and wherein said liquid contains finely divided inorganic matter originally present in said coal or lignite and wherein said treatment substantially removes said inorganic matter from said liquid fuel.

24. The method of claim 19 wherein said liquid undergoing treatment in step (c) is waste water from the processing of a mineral containing asbestiform matter and wherein said treatment substantially removes finely particulate asbestiform matter from said waste water.

25. A liquid-solid contactor comprising:
a pair of upwardly extending horizontally spaced-apart perforate retaining walls;
a liquid inlet compartment adjacent and in communication with the perforations of the first of the perforate walls;
a liquid outlet compartment in communication with the perforations of the second of the perforate walls;
closure means about the space between the first and second perforate walls closing said space against the passage of liquid except through the perforations of said perforate walls;
feed means for supplying a loose solid particulate material into the space between the perforate walls;
a plurality of support members each adjacent a perforation of said first perforate wall, said support members being arranged to extend outwardly from below their adjacent perforations and into the inlet compartment to support and expose to the inlet compartment a plurality of free surfaces of particulate material, said support members being arranged cooperatively to support the particulate material and retain the material within said space, a said support member having two surfaces articulated at an edge joint substantially adjacent and below the member's respective perforation and wherein each of the two surfaces is arranged to extend outwardly and downwardly in a gentle curve from said edge joint and then to extend further in a gentle curve outwardly and upwardly into the inlet compartment;
an inlet for admitting a liquid into the inlet compartment for passage into the free surfaces and through the particulate material to the outlet compartment;
an outlet for discharging liquid from the outlet compartment;
means for periodically effecting a body movement toward the inlet compartment of at least those portions of the particulate material including said free surfaces and which are retained on said supporting members, said body-movement means comprising means for effecting a transient flow of liquid from said outlet compartment through the perforations of the second of said perforate walls and thence through said particulate material in said space and from said free surface into said inlet compartment to produce first a rise and subsequently a fall in the pressure difference between said outlet compartment and said inlet compartment, said means for effecting said transient flow including
a. means for moderating said transient flow so that said pressure difference remains greater than a critical minimum difference for a non-zero time interval less than about 2000 milliseconds, said critical minimum difference being that difference at which a steady flow of liquid from said outlet compartment to said inlet compartment just produces a localized spill of particulate material from said free surfaces into said inlet compartment, and
b. means for moderating said transient flow so that said pressure difference produced by said transient flow peaks to a top value within no more than about 600 milliseconds after said difference surpasses said critical minimum difference; and
means for discharging from the inlet compartment material which is spilled thereinto by the body-movement means.

26. The liquid-solid contactor of claim 25 including means for introducing into a liquid a granular or fibrous medium and pipe means for supplying said liquid to said inlet, and also including means for causing a liquid to flow suddenly through said inlet into the inlet compartment for sudden passage into said free surfaces.

* * * * *